United States Patent Office 2,726,952
Patented Dec. 13, 1955

2,726,952

METHOD OF PREPARATION OF IRON ALUMINUM ALLOYS

Eric R. Morgan, Inkster, Mich., assignor to Ford Motor Company, Dearborn, Mich., a corporation of Delaware No Drawing. Application May 5, 1954,
Serial No. 427,881

4 Claims. (Cl. 75—49)

The subject matter of this invention relates to the science of ferrous metallurgy and more exactly with that portion of the art of ferrous metallurgy which deals with the melting and casting of low carbon iron aluminum alloys containing aluminum in the range of 5 to 18 per cent.

These alloys per se have been explored rather intensively recently in search of an alloy having good magnetic properties and involving little or no drain upon the supply of critical alloying metals. This type of iron aluminum alloy is treated at length in a publication by U. S. Naval Ordnance Laboratory dated April 9, 1953, and designated Navord Report 2819.

To secure acceptable results from this iron aluminum system of alloys, it is essential that the oxygen content be held to an irreducible minimum. In the preparation of iron aluminum alloys the Naval Ordnance Laboratory worked in a vacuum furnace which was pumped down to a pressure of about 200 microns, after which the iron was inductively melted. The melting of the iron was accompanied by a rise in the vacuum furnace chamber pressure to 500 to 1,000 microns due to the liberation of dissolved gases from the melt. This molten and partially degasified iron was then decarburized with a stream of wet hydrogen for half an hour followed by treatment with extremely dry hydrogen to effectively deoxidize the melt. The vacuum chamber was then purged of hydrogen by means of pure dry helium and then pumped down to a pressure of 2½ millimeters. This removes dissolved hydrogen and results in a rather thoroughly decarburized, dehydrogenized and deoxidized melt. The vacuum chamber was then refilled with helium, the aluminum added, the temperature adjusted to 1650 to 1675° centigrade and the metal chill cast under the helium atmosphere.

The procedure of the instant invention has been developed to obviate this tedious, hazardous and expensive deoxidation and dehydrogenation procedure and produce an alloy of equally satisfactory physical properties.

In the execution of applicant's invention, the iron to be melted is charged into an alumina refractory crucible which is placed in an induction heated vacuum chamber. It is necessary that the oxygen present in the molten iron be removed and this is best done by reaction with carbon. This carbon may be added to the crucible along with the cold iron or it may be reserved until the melting is complete and the bulk of the oxygen has been removed by the action of the vacuum and the carbon then added to cause the ebullition of the remaining oxygen as carbon monoxide. The late addition of the carbon has the advantage of requiring a smaller amount of carbon. This carbon may be added as elemental carbon such as amorphous carbon or graphite or in the form of a carbide which is readily decomposed at iron melting temperatures. For example, the carbon may be added in the form of a very pure white iron or in the form of silicon carbide. The carbon is added in the granular form.

It is necessary that slight excess of carbon be added beyond that necessary to reduce the oxygen level of the melt to the desired minimum. It is desirable that this carbon be removed or neutralized by the addition of a strong carbide former such as zirconium, titanium, niobium or tantalum. When the graphite former has been thoroughly incorporated into the melt, the aluminum is added and the alloy is cast immediately.

A ten pound melt of iron aluminum alloy was prepared by melting in an alumina refractory crucible 8.31 pounds of an iron stock containing about 0.07% oxygen. This iron was melted in contact with 3 grams of granulated electrode graphite. This melting was done by induction heat at a pressure of less than 100 microns. The melting chamber was not purged of air or otherwise specially prepared prior to being evacuated. After melting, the molten metal was held at about 2900° F. for about fifteen minutes and the pressure had dropped to a constant low value of about one micron. One hundred forty two grams of titanium sponge were added and when this was thoroughly melted 648 grams of aluminum were added. This resulted in an ingot having the following analysis:

| | Per cent |
|---|---|
| Carbon | 0.02 |
| Titanium | 3.1 |
| Aluminum | 14.0 |

This melting procedure yielded a product having an ultimate tensile strength of 135,000 pounds per square inch at 750° F. and a stress rupture life of 250 hours at 1200° F. under a load of 25,000 pounds per square inch.

I claim as my invention:

1. The process of preparing a ductile and substantially oxygen free alloy of iron and aluminum comprising fusing under vacuum conditions an iron charge in the presence of carbon, continuing the application of the vacuum conditions after fusion has taken place until the ebullition of carbon monoxide has ceased and the pressure has dropped to a substantially constant low value, adding and fusing into the bath at least sufficient metal of the group consisting of zirconium, titanium, niobium and tantalum to chemically combine with any residual carbon, adding metallic aluminum to an extent sufficient to produce an aluminum content of 5 to 18% and casting the alloy, all of said operations being conducted without interruption of the vacuum conditions.

2. The process of producing a ductile and substantially oxygen free alloy of iron and aluminum comprising fusing under vacuum conditions an iron charge, permitting the greater part of the oxygen content to evolve from the melt, adding carbon to the partially degassed melt and permitting the ebullition of carbon monoxide to proceed practically to completion and the pressure has dropped to a substantially constant low value, adding and fusing into the bath at least sufficient metal of the group consisting of zirconium, titanium, niobium and tantalum to chemically combine with any residual carbon, adding metallic aluminum to an extent sufficient to produce an aluminum content of 5 to 18%, and casting the alloy, all of said operations being conducted without interruption of the vacuum conditions.

3. The process of producing a ductile and substantially oxygen free alloy of iron and aluminum comprising fusing under vacuum conditions an oxygen containing iron charge, permitting the molten charge to react with a readily decomposable carbide until the ebullition of carbon monoxide has practically ceased and a relatively constant low pressure value has been established, adding and fusing into the bath at least sufficient metal of the group consisting of zirconium, titanium, niobium and tantalum to chemically combine with any residual carbon, adding metallic aluminum to an extent sufficient to produce an aluminum content of 5 to 18%, and casting the alloy, all of said operations being conducted without interruption of the vacuum conditions.

4. The process of preparing a ductile and substantially oxygen free alloy of iron and aluminum comprising evacuating a melting chamber of the bulk of its contained air, melting in the residual air an oxygen containing iron charge, permitting the molten iron to react with a slight excess of carbon until the ebullition of carbon monoxide practically ceases and the pressure has dropped to a substantially constant low value, adding and fusing into the bath sufficient metal of the group consisting of zirconium, titanium, niobium and tantalum to chemically combine with any residual carbon, adding metallic aluminum to an extent sufficient to produce an aluminum content of 5 to 18%, and casting the alloy, all of said operations being conducted without interruption of the vacuum conditions.

No references cited.